July 12, 1949.  J. C. SIMPSON  2,475,806
CHAIN AND AXLE ADJUSTER OF REAR WHEELS OF CYCLES
Filed May 24, 1946
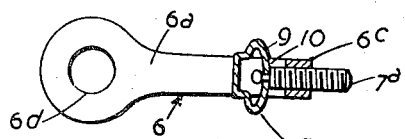
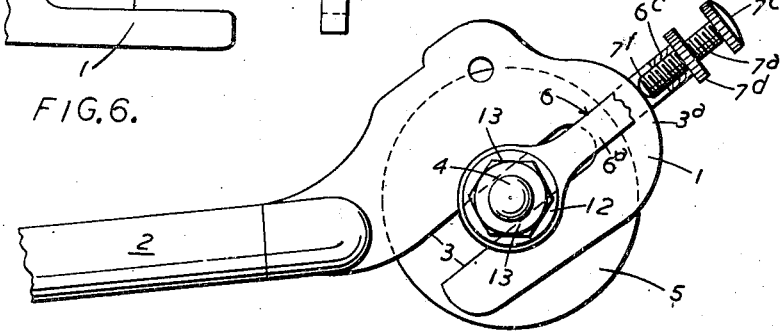
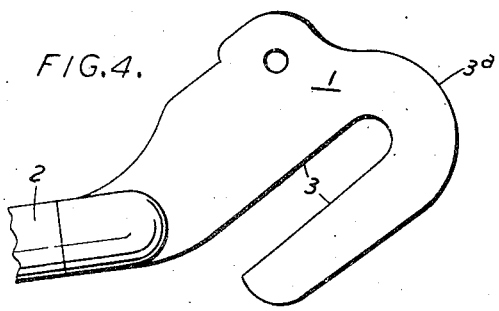
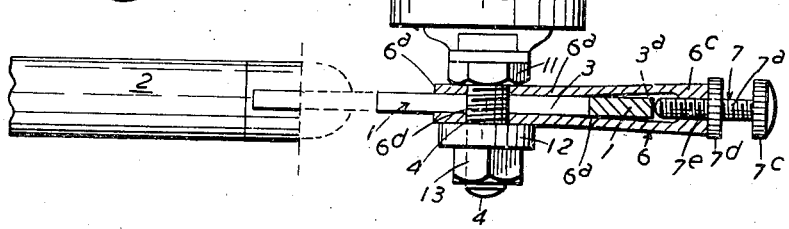
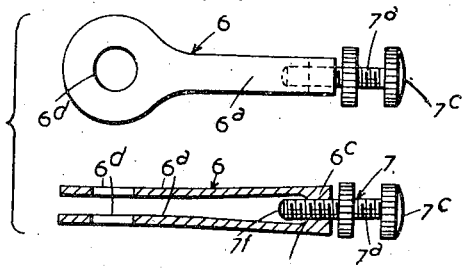
John Cecil Simpson *Inventor*
By *Attorney*

Patented July 12, 1949

2,475,806

UNITED STATES PATENT OFFICE 2,475,806

CHAIN AND AXLE ADJUSTER OF REAR WHEELS OF CYCLES

John Cecil Simpson, Birmingham, England, assignor to Cyclo Gear Company Limited, Birmingham, England Application May 24, 1946, Serial No. 672,035
In Great Britain January 7, 1946

3 Claims. (Cl. 74—242.14)

The invention relates to chain and axle adjusters for the rear wheel of a chain-driven cycle, and particularly to adjusters of the "sports" type of cycle of this kind having forward-drop-out fork-ends one at each side of the rear of the cycle frame, permitting of quick and easy removal of a rear wheel for changing a tyre or wheel, or for other purposes well known to riders in road racing and for quick and easy replacement of said wheel. The two fork ends, aforesaid, are each a shaped flat plate disposed vertically with its slot inclined forwardly and downwardly to engage the ends of the axle of the rear wheel, this type of fork-end being almost exclusively in use on sports models of chain-driven cycles. The back edge of this type of fork-end is approximately of semi-circular shape, conforming with the curved and closed upper end of the slot. In all cycle frames there is a certain amount of resiliency, tranversely, in the rear forks.

In long distance road races a rider generally carries spare tyres around his neck or body, and any change of tyre to the rear wheel means the removal of said wheel from the frame and chain during the race; hence the adoption of the type of fork-ends, aforesaid, for quick and easy removal and re-assembly of said wheel.

Sports model cycle frames are built as light in weight as possible consistent with the powerful pedalling action of race riders, and the great trouble experienced by such riders is that of a "wobbling" or untrue rear wheel, due to inefficiency in the chain and axle adjusters, and also in the insecurity of the tightening-up axle nuts, as well as from some deformity, or spring, which may be inherent in the rear forks of the frame.

The invention provides the hereinafter described and claimed improved construction of chain and axle adjuster operative mainly to effectively prevent "wobble" of rear wheel—a very serious and usual complaint with cycle racing men—but also to better control and fix the chain and axle adjustment and quicken the removal and re-assembly of the wheel.

A chain and axle adjuster according to the invention is characterised by an elongated U-shaped swingable structure formed with coincident axle-threading holes through its spaced longitudinal branches near the free ends thereof, and by pull-up screw, or equivalent devices, applied to its transverse joining-up, or closed, end to operate in the space between the branches of the U-shaping and against the edge of the fork end.

In use, each plate-like fork-end fits closely between the two branches of the U-shaped structure with the holes in said branches swingably engaging the axle end one each side the fork end, and with the pull-up screw device operating against the rear edge of the fork end; in this way providing a double and equal pull on the axle end each side of the fork-end while adjusting the chain and axle, instead of a single pull at one side of the fork-end only by the use of the ordinary cranked adjuster which has several objections to its use.

The screw device is locked to the structure after pull-up for chain and axle adjustment.

When the outside nut rigidly clamping the structure and the fork end to the axle is loosened said structure together with the pull-up device can be swung downwardly about the axle end to clear it of the fork-end sufficiently to enable the axle end, with the structure still threaded upon it, to be removed by way of the downwardly-open inclined slot of the fork end, the outside clamping nut being still upon the axle end. The chain and axle adjustment screw may still be locked, so that on re-assembling the wheel and its parts the chain and axle adjustment is the same as it was before the wheel was removed.

The invention will now be described with the help of the accompanying drawings.

Fig. 1 is a side elevation of the essential parts.

Fig. 2 is a plan view of Fig. 1 with parts in section.

Fig. 3 is a side view and a sectional plan of the adjuster, separately.

Fig. 4 is a side view of the fork-end, Fig. 1, separately.

Fig. 5 is a modification of pull-up screw device.

Fig. 6 shows another well known shape of plate-like fork end.

Fig. 7 is a side section of an adjuster to be used with the fork-end, Fig. 6.

Fig. 8 is a separate view of the abutment member of the screw, Fig. 7.

In Figs. 1 to 4 the rear fork-end 1 of the cycle frame 2 is of the well known type in a sports cycle, it being plate-like and having the usual inclined slot 3 for a forward drop-out of the end of the wheel axle 4. The wheel hub mounted about the axle 4 is indicated at 5.

The chain and axle adjuster combines the elongated U-shaped rigid structure, 6, and the pull-up screw devices 7.

The structure 6 has spaced longitudinal branches 6a, 6a, and a transverse joining-up closed end 6c. Through the branches 6a, 6a, near the free ends thereof, are formed coincident holes 6d for threading over the end of the axle 4 so that the structure can swing on said end, the fork-end 1 fitting sandwiched between the branches and also engaging, by its slot 3, the end of the axle, as clearly shown in Fig. 2.

The pull-up screw device 7 comprises a screw pin 7a, having a head 7c, a lock nut 7d, and a screwthreaded hole 7e in the closed end of the U-shaped structure 6, the latter to accommodate said pin to operate longitudinally in the space between the branches 6a and against the rear end 3a of the plate-like fork end 1.

In Figs. 1 to 4 the forward end 7f of the pin 7a operates against the semi-circular end 3a of the fork-end 1, while in Figs. 5, 7 and 8 said forward-end carries a swivelled contacting piece 9, the one in Fig. 5 being a curved and narrow metal strip swivelled to the forward end of the pin 7a and adapted to abut against the semi-circular edge of the fork end, and the one in Figs. 7 and 8 of somewhat D-shape in side view to suit the fork-end, Fig. 6, the forward portion of this connecting piece 9 to engage within the fork end and the shoulders between said forward portion and the rear portion of said piece to abut against the rear edges of the fork end; this modified contact piece, Figs. 7 and 8, being formed with a resilient opening 10 to snap engage over the spherical forward-end of the pin 7a into a circular neck at the back of the spherical end as clearly shown by the drawings.

The inner nut 11 is a stationary locking one to the bearings (not shown) operative between the hub 5 and the axle 4, and one branch 6a of the U-shape structure 6 takes an axial abutment against this nut, while an inner washer 12 on the axle intervenes between the other branch 6a and the outside clamping nut 13, the washer 12 having preferably a serrated inner face.

It will be clear from Fig. 2 that the fork-end 1 is disposed sandwiched between the two swingable branches 6a, 6a, with its slot 3 engaged by the end of the axle 4, and with its rear edge 3a contacted by the end of the screw pin 7a.

In operation, the screw pin 7a exerts a central and even pull on the two branches 6a, 6a, from the fork-end as an abutment, while the branches transmit said pull to the end of the axle 4 one on each side of the fork end and, therefore, at two points distanced by the thickness of the fork-end, to thus effectively prevent any development of "wheel wobble," a fatal occurrence to a racing man's chance of winning a race, the pull on the axle end from the adjuster being truly at right angles to said axle.

Two adjusters according to the invention are used on a cycle, one to each of the two fork-ends and to each end of the axle 4; and it is obvious that in addition to adjusting the chain more accurately the two ends of the axle 4 will be so efficiently and positively held, when the rear wheel is once in "true track," that no "wobble" in the wheel can possibly develop, even should the outside clamping nuts 13 become loose.

To remove the wheel from the frame the two outside axle nuts 13 (one only is shown) are loosened, and both adjusters are then swung downwardly about the axle ends to clear the fork-ends, when the axle with the wheel mounted upon it will drop out of the slots, the outside nuts and washers and both adjusters being still carried upon the axle ends.

In the form of invention, Figs. 1 to 5, the pull-up screw pin 7a can still remain locked in adjusted position to the structure 6, but in the form Figs. 6 to 8, said screw pin must be loosened before the adjuster can be swung down.

What I claim is:

1. Chain and axle adjuster for the rear wheel of a cycle comprising an elongated U-shaped rigidly built swingable structure provided through its spaced longitudinal branches with opposite holes adapted to swingably engage a wheel axle end, and a pull-up screw device applied to the closed transverse end of said U-shaped structure to operate longitudinally within the space between the branches of the U-shaping and against the edge of a slotted fork end of a cycle frame.

2. An adjuster according to claim 1, and combining an axle end, a slotted fork end engaging the axle end and disposed sandwiched between the branches of the U-shaped structure, means for locking the pull-up device in adjusted position, and means on the axle end for locking together the U-shaped structure, axle end and fork end.

3. Chain and axle adjuster for the rear wheel of a cycle, combining an axle end, a forward drop-out fork end engaging said axle end, a U-shaped swingable structure whose branches have opposite holes engaging the axle end, a branch disposed each side of the fork end, a pull-up screw device applied to the closed transverse end of the U-structure to operate between the branches thereof and against an edge of the fork end, and means applied to the axle end to secure together said axle end, U-shaped structure and fork end.

JOHN CECIL SIMPSON.

REFERENCES CITED

The following references are of record in the file of this patent:

FOREIGN PATENTS

| Number | Country | Date |
| --- | --- | --- |
| 19,434 | Great Britain | 1897 |
| 4,113 | Great Britain | 1899 |